(12) United States Patent
Da Silva

(10) Patent No.: US 12,297,766 B2
(45) Date of Patent: May 13, 2025

(54) THERMOSTATIC VALVE

(71) Applicant: VERNET, Ollainville (FR)

(72) Inventor: William Da Silva, Villeconin (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 18/292,550

(22) PCT Filed: Jul. 28, 2022

(86) PCT No.: PCT/EP2022/071253
§ 371 (c)(1),
(2) Date: Jan. 26, 2024

(87) PCT Pub. No.: WO2023/006902
PCT Pub. Date: Feb. 2, 2023

(65) Prior Publication Data
US 2025/0084782 A1  Mar. 13, 2025

(30) Foreign Application Priority Data
Jul. 29, 2021 (FR) ...................... 2108243

(51) Int. Cl.
*F01P 9/00* (2006.01)
*F01P 7/16* (2006.01)
*G05D 23/13* (2006.01)

(52) U.S. Cl.
CPC .............. *F01P 7/16* (2013.01); *G05D 23/132* (2013.01)

(58) Field of Classification Search
CPC ..... F01P 7/16; F01P 2007/146; F16K 31/002; F16K 11/044

USPC ....................................................... 123/41.01
See application file for complete search history.

(56) References Cited

U.S. PATENT DOCUMENTS

| 2003/0177985 | A1 | 9/2003 | Engelin et al. | |
|---|---|---|---|---|
| 2004/0238650 | A1* | 12/2004 | Luig | G05D 23/1346 236/12.11 |
| 2014/0361091 | A1* | 12/2014 | Da Silva | G05D 23/134 236/12.21 |

(Continued)

OTHER PUBLICATIONS

International Search Report, corresponding International Application No. PCT/EP2022/071253, mailing date Nov. 4, 2022.

(Continued)

*Primary Examiner* — Long T Tran
*Assistant Examiner* — James J Kim
(74) *Attorney, Agent, or Firm* — MARSHALL, GERSTEIN & BORUN LLP

(57) ABSTRACT

The valve includes a housing, a thermostatic element, a first shutter displaced by the thermostatic element along an axis relative to a first seat integrated into the housing to control a flow of fluid between the first and second paths, a cage, a first return spring, a second shutter axially displaced by the thermostatic element relative to a second shutter axially displaced by the thermostatic element with respect to a second seat integrated into the cage, a third shutter axially displaced by the fluid overpressure in the second path relative to a third seat integral with the cage, and a second return spring. The cage includes a tubular part, which is centred on the axis and through the interior of which fluid flows between the second and third paths. An outer face of the tubular part is provided with a seal. The cage also includes arms.

10 Claims, 10 Drawing Sheets

(56) References Cited

U.S. PATENT DOCUMENTS

2015/0211395 A1* 7/2015 Gooden ................ F01M 5/007
                                                         236/34.5
2022/0034418 A1* 2/2022 Medina ................ F16K 31/002

OTHER PUBLICATIONS

French Search Report, corresponding French Application No. FR 2108243, mailing date Mar. 18, 2022.

* cited by examiner

THERMOSTATIC VALVE

FIELD OF THE DISCLOSURE

This invention relates to a thermostatic valve.

The invention relates in particular to thermostatic devices and valves which are used in the cooling circuits of internal combustion engines, especially those of motor vehicles, heavy-duty vehicles, two-wheelers and stationary engines. However, this field of application is not limiting to the invention, in the sense that the valve according to the invention can be used in various other fluid circuits, for example gearbox cooling circuits, oil circuits, etc.

BACKGROUND

Thermostatic valves are used in many fluid applications, particularly for cooling internal combustion engines, to regulate the circulation of a fluid, i.e. to distribute the fluid between different flow paths, depending in particular on the temperature of the fluid. These valves are said to be thermostatic, in the sense that the movement of their internal shutter(s) is controlled by a thermostatic element, i.e. an element which comprises a body, containing a thermodilatable material, and a piston, immersed in this thermodilatable material, the body and the piston being movable relative to each other in translation along the longitudinal axis of the piston.

SUMMARY

The invention relates more specifically to valves with at least three paths, in particular which divide at least one fluid inlet between at least two fluid outlets or which supply at least one fluid outlet via at least two fluid inlets. These valves with at least three paths are typically used to regulate the circulation of a cooling fluid with respect to both an engine to be cooled by this fluid and a heat exchanger, in particular a radiator, cooling this fluid: when the fluid temperature is too high at the valve, the valve sends it to the exchanger via a main path to be cooled there before being sent to the engine to be cooled and then returned to the valve, whereas when the fluid temperature is sufficiently low at the valve, the valve sends the fluid directly to the engine from where it is returned to the valve, via a bypass path not passing through the exchanger, commonly known as the by-pass path. To do this, the valve includes a main shutter, which controls fluid flow in the main path, and a bypass shutter, which controls fluid flow in the bypass path. The same thermostatic element can then operate the main shutter and the by-pass shutter in opposite directions. To do this, a movable part of the thermostatic element is connected for movement to a single assembly including the main shutter and the by-pass shutter, by means of the interposition of a return spring between this assembly and a bracket which, in use, is fixedly connected to a housing of the valve, to which a fixed part of the thermostatic element is fixedly connected. This fixed part of the thermostatic element is generally its piston, while the moving part corresponds to its body. Depending on the geometry of the valve housing, the above-mentioned bracket has more or less complex shapes, shaped to enable the bracket to be securely attached to the housing, the bracket typically being made of sheet metal which is shaped by stamping, folding, cutting, etc.

Existing thermostatic valves can include a pressostatic function which allows, when the by-pass shutter is opened to allow fluid flow in the by-pass path, to prevent this flow by a pressostatic shutter if the fluid pressures on either side of the by-pass shutter are balanced. In the case of a cooling circuit for an internal combustion engine, this type of pressure equilibrium is encountered in particular when the engine is started. As soon as the fluid in the valve is at excess pressure in relation to the bypass path, the pressostatic shutter is displaced by the fluid, which can then flow into the bypass path as long as the bypass shutter remains open. The pressostatic shutter is arranged in a dedicated pressostatic module. It may be provided that the pressostatic module incorporates the seat against which the by-pass shutter is supported when the shutter is closed, this pressostatic module to be fixedly attached to the aforementioned bracket, which runs the risk of this pressostatic module being incorrectly positioned, or even unexpectedly detached, particularly during handling operations on the valve alone, and then assembly of this valve in the fluid circuit.

US 2003/177985 discloses a thermostatic valve for an internal combustion engine cooling circuit. This thermostatic valve comprises a housing which is not described in detail and which is only represented schematically in the form of a single integral part. This housing is supplied with fluid by an inlet from the engine to be cooled and supplies two outlets, namely a first outlet sent to a radiator and a second outlet sent to a bypass line. The valve also has three shutters, a first shutter controlling fluid flow between the inlet and first outlet, and second and third shutters controlling fluid flow between the inlet and second outlet. The first and second shutters are controlled for movement by a thermostatic element so that the first shutter opens when the second shutter closes, and vice versa. The third shutter is also driven by the thermostatic element, more precisely by a rod integrally connected to the thermostatic element, which rests against the third shutter and thus opens it when the thermostatic element begins to deploy.

The aim of this invention is to provide a thermostatic valve of the type mentioned above, which, while being economical and reliable, is easier to handle and assemble.

In this regard the invention relates to a thermostatic valve, comprising:
  a housing adapted, in use, to channel a fluid along a first path and to be fixedly attached to a casing provided to channel the fluid along a second and third path,
  a thermostatic element including a fixed part, which is fixedly connected to the housing, and a movable part that is movable along an axis with respect to the fixed part, moving away from the fixed part under action of an expansion of a thermodilatable material of the thermostatic element,
  a first shutter that is axially movable relative to a first seat integrated with the housing between a first closed position, in which the first shutter is pressed against the first seat, preventing the fluid from flowing between the first and second paths through the thermostatic valve, and a first open position, in which the first shutter is away from the first seat, allowing the fluid to flow between the first and second paths through the thermostatic valve, the first shutter being connected to the movable part of the thermostatic element so that, when the thermodilatable material expands, the movable part drives the first shutter into the first open position,
  a one-piece cage adapted to be fixedly assembled to the housing,
  a first return spring, which is compressed in the axis by applying opposing forces respectively to the first shutter and to the cage, and which, when the thermodilatable material contracts, returns the movable part towards the fixed part of the thermostatic element, driving the first shutter into the first closed position, a second shutter that is axially movable relative to a second seat integrated with the cage between a second closed position, in which the second shutter is pressed against the second seat, preventing the fluid from flowing between the second and third paths through the thermostatic valve, and a second open position, in which the second shutter is away from the second seat, allowing the fluid to flow between the second and third paths through the thermostatic valve, the second shutter being connected to the movable part of the thermostatic element so as to be driven into the second open position when the first shutter is driven into the first closed position and to be driven into the second closed position when the first shutter is driven into the first open position, a third shutter that is axially movable relative to a third seat integrated with the cage between a third closed position, in which the third shutter is pressed against the third seat, preventing the fluid from flowing between the second and third paths through the thermostatic valve, and a third open position, in which the third shutter is away from the third seat, allowing the fluid to flow between the second and third paths through the thermostatic valve, the third shutter being mounted on the cage so as to be driven by the fluid into the third open position when the second path is pressurised relative to the third path, and a second return spring, which is compressed in the axis by applying opposing forces respectively to the third shutter and to the cage, and which, when the second and third paths are pressure-balanced, drives the third shutter into the third closed position, wherein the cage includes a tubular part, which is substantially centred on the axis and through inside which the fluid flows between the second and third paths when the second and third shutters are in the second and third open positions respectively, wherein an outer face of the tubular part of the cage is provided with a seal that, in use, isolates the second and third paths from each other outside the tubular part, and wherein the cage further includes arms, which each extend towards the housing from the tubular part and which connect the cage to the housing.

One of the ideas behind the invention is to integrate at least three functions within the same one-piece thermostatic valve part: the pressostatic function, the function of fixed assembly to the housing, and the seat function for the second shutter, typically the by-pass shutter. This one-piece part, known as the cage within the thermostatic valve conforming to the invention, can advantageously be made of plastic, particularly for reasons of economy and modularity. In all cases, this cage simplifies and secures valve assembly. In particular, by handling this cage while the third shutter and the second return spring are already loaded by the cage without any risk of unexpected release, it is possible, in a single operation, to fix it to the housing, to take up the force of the first return spring, and to position the second seat, i.e. the seat typically associated with the by-pass shutter. This makes the valve particularly easy to handle and install, as well as being reliable and economical.

According to additional advantageous features of the thermostatic valve according to the invention:

The cage is made of a plastic material.

The arms each comprise, opposite the tubular part, an end which, when the cage is in an assembled state in which the cage is connected to the housing, retains the arm relative to the housing by cooperating in a form-fitting manner with a lug of the housing.

Said end of each arm and the lug of the housing, which is associated with said end, are respectively provided with hooking surfaces, which, in the assembled state of the cage, are pressed against each other and which are inclined with respect to the axis so as to lock their support in the assembled state of the cage.

Said end of each arm and the lug of the housing, which is associated with said end, are respectively provided with axial stops which are designed to interfere axially with each other so as to prevent unhooking of the hooked surfaces in the assembled state of the cage.

The arms are elastically deformable so that, when the cage is assembled to the housing, the said ends of the arms are first moved away from the axis by deformation of the arms in order to arrange the lugs of the housing between the said ends, then are returned towards the axis by elastic return of the arms to clamp the lugs of the housing between said ends in the assembled state of the cage.

The cage also includes a skirt for receiving the third shutter, which extends away from the housing from the tubular part and inside which the third shutter is housed and is guided between the third closed and open positions, and the thermostatic valve also comprises a retainer, which is fixedly attached to the skirt and on which the second return spring is supported, being centred on the axis by a relief of the retainer.

The cage also includes force transmission elements, which each extend from the tubular part and which are designed, when the cage is assembled to the housing, to axially support a bracket which is mounted so as to be axially movable on the movable part of the thermostatic element and on which the first return spring is supported.

The thermostatic valve also comprises an overtravel spring, which is compressed in the axis by applying opposing forces respectively to the second shutter and to the movable part of the thermostatic element, this overtravel spring being designed to:

movably link the movable part of the thermostatic element with the second shutter when the second operator is driven between the second open and closed positions, and be elastically compressed when the expansion of the thermodilatable material causes the movable part to move away from the fixed part of the thermostatic element when the second shutter is in the second closed position.

The movable part of the thermostatic element is fixedly connected to a retaining member, against which the overtravel spring is supported, and against which the first return spring causes the bracket to bear in order to retain the bracket axially with respect to the movable part as long as the bracket is not supported by the force transmission elements when the cage is not assembled to the housing.

BRIEF DESCRIPTION OF THE DRAWINGS

The invention will be better understood upon reading the following description, given only as an example, and with reference to the drawings, in which.

DETAILED DESCRIPTION

Figure 1:
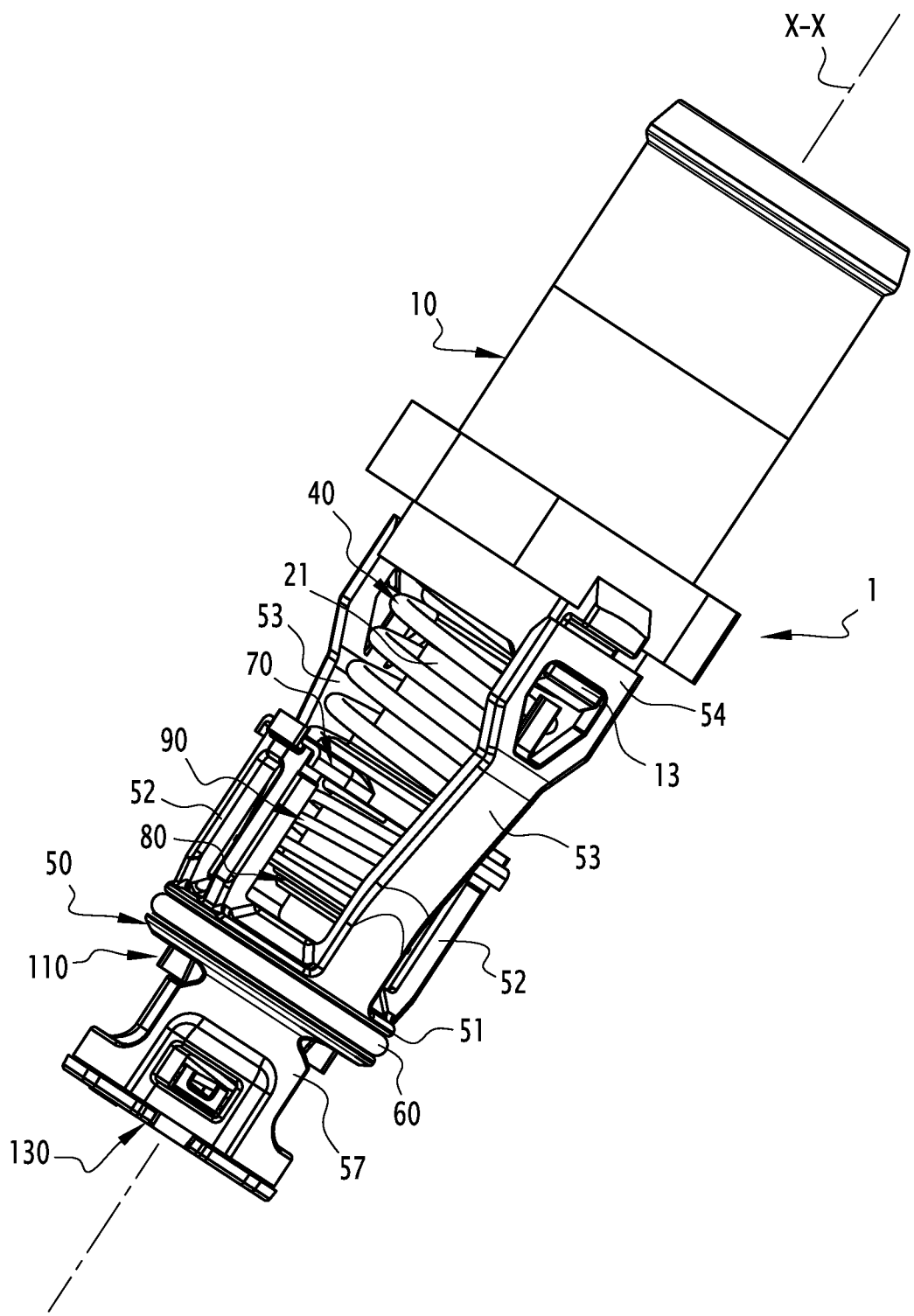
FIG. 1 is an elevation view of a valve according to the invention, in an assembled state.
Figure 2:
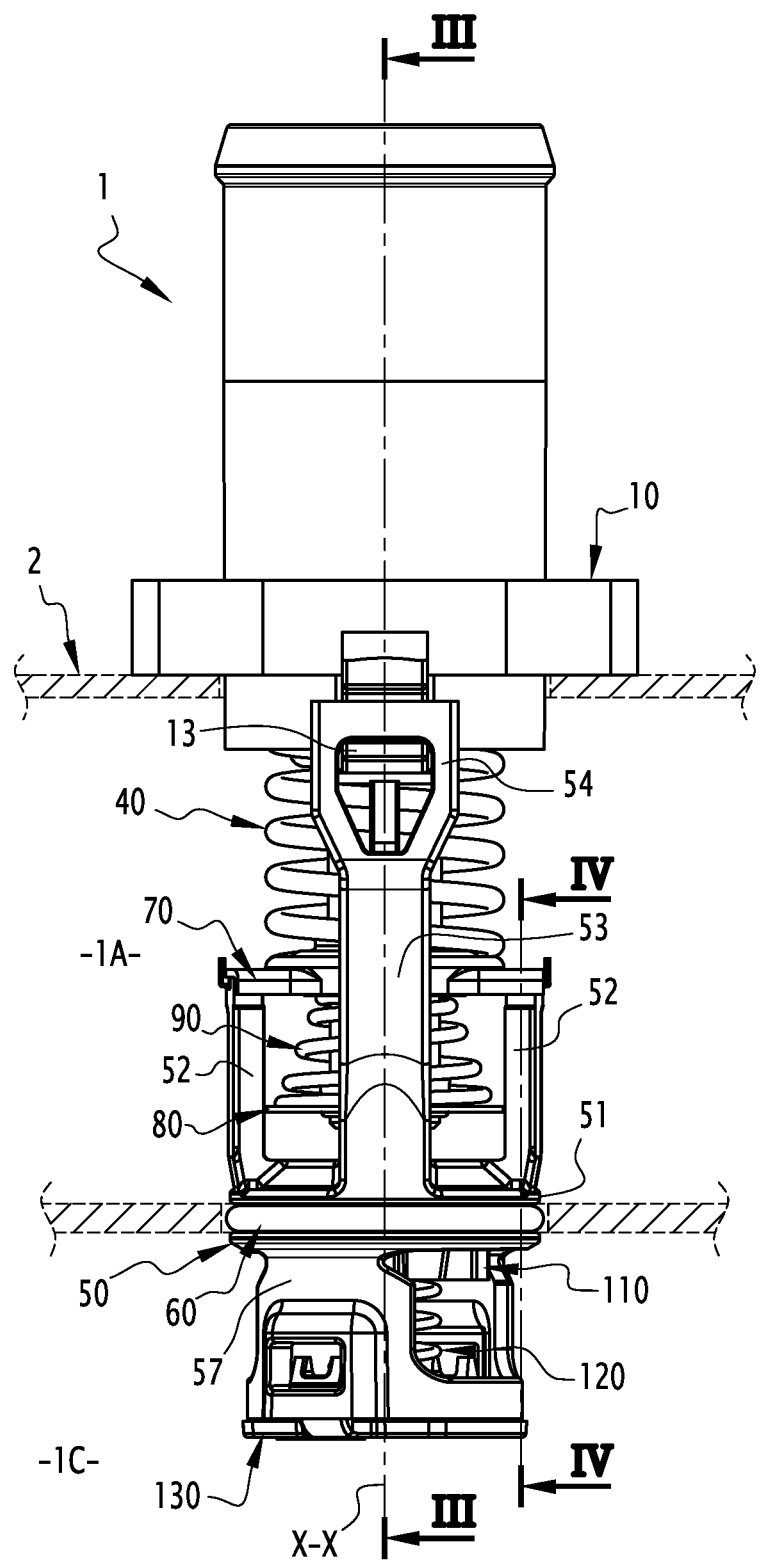
FIG. 2 is an elevation view of the valve of FIG. 1.

FIGS. 1 to 10 show a thermostatic valve 1 for regulating the circulation of a fluid between different paths of a fluid circuit. This fluid is, for example, a cooling fluid, so the valve 1 is part of a cooling circuit for an internal heat combustion engine, in particular a motor vehicle engine.

There are at least three of these paths and, as shown in FIGS. 2 and 5 to 8, they are labelled 1A, 1B and 1C respectively. As will be explained in more detail later, the valve 1 enables fluid flow to be controlled through it, from at least one of the paths 1A, 1B and 1C to at least one other of these paths. The paths 1A, 1B and 1C constitute either one fluid inlet and two fluid outlets, or two fluid inlets and one fluid outlet to valve 1.

By way of a non-limiting application example, which will be referred to again later, when the valve 1 belongs to an engine cooling circuit, the path 1A constitutes a fluid inlet, coming from the engine to be cooled by this fluid, while, on the one hand, the path 1B constitutes a first outlet for this fluid, sending it to a heat exchanger, such as a radiator, designed to lower the temperature of the fluid passing through it, before this fluid is sent to the engine to be cooled, and, on the other hand, the path 1C constitutes a second outlet for this fluid, which sends the fluid to the engine without passing through the aforementioned heat exchanger. It is understood that the path 1C feeds a bypass. In this way, the cooling fluid sent to the engine by valve 1 comes at least from its paths 1B and 1C and, after cooling the engine, is returned to the valve, more precisely to at least its path 1A. This being said, the application example detailed above is not restrictive for valve 1, in the sense that this valve can be used in many other fluid circuit contexts. For example, as an alternative to the aforementioned application example, the path 1C may be provided for fluid flow to or from a unit heater, in particular for heating the passenger compartment of a vehicle fitted with the aforementioned engine.

Valve 1 comprises a housing 10 designed to be fixedly attached to a casing 2 which, together with housing 10, defines the paths 1A, 1B and 1C. More specifically, when the valve 1 is in use, the housing 10 channels the fluid along the path 1B, while the casing 2 channels the fluid along the paths 1A and 1C. In practice, the design of the casing 2 is not limiting, so that this casing 2 is only represented partially and schematically, and only in some of the figures. By way of a non-limiting example, the casing 2 belongs to a housing of the aforementioned engine. Similarly, the configuration of the housing 10 relating to its attachment to the casing 2 and its fluid channeling along the path 1B are not restrictive and are therefore only partially and schematically shown in the figures.

The valve 1 comprises a thermostatic element 20 which is centred on a geometric X-X axis. The thermostatic element 20 includes a body 21, centred on the X-X axis and containing a thermo-dynamic material such as a wax. The thermostatic element 20 also comprises a piston 22, the longitudinal geometric axis of which is aligned with the axis X-X and an axial end part of which is engaged inside the body 21 so that the thermodilatable material contained in this body 21 can act on this axial end part of the piston 22. The body 21 and the piston 22 are movable relative to each other in translation along the axis X-X: under the effect of an expansion of the thermodilatable material, the piston 22 extends outside the body 21, whereas, when the thermodilatable material contracts, the piston is retractable inside the body 21.

In the assembled state of the valve 1, the piston 22 of the thermostatic element 20 is fixedly connected to the housing 10. More precisely, the upper end part of this piston 22, opposite that located inside the body 21, is fixedly connected, at least along the axis X-X, to a part 11 of the housing 10, arranged across the X-X axis. In practice, various forms of implementation are conceivable with regard to the secured connection of the aforementioned upper end part of the piston 22 to the part 11 of the housing 10: this secured connection can be made either solely by axial support, or by releasable fastening, such as snap-on or sliding fit, or by permanent connection, such as a press fit, overmoulding or the addition of a mechanical holding system. In any case, it is understood that when the thermally expandable material contained in the body 21 expands or contracts, the piston 22 is kept immobile with respect to the housing 10, due to the secured connection of the aforementioned upper end part to part 11 of this housing, while body 21 moves away from, respectively towards, piston 22 along the X-X axis.

Figure 5:
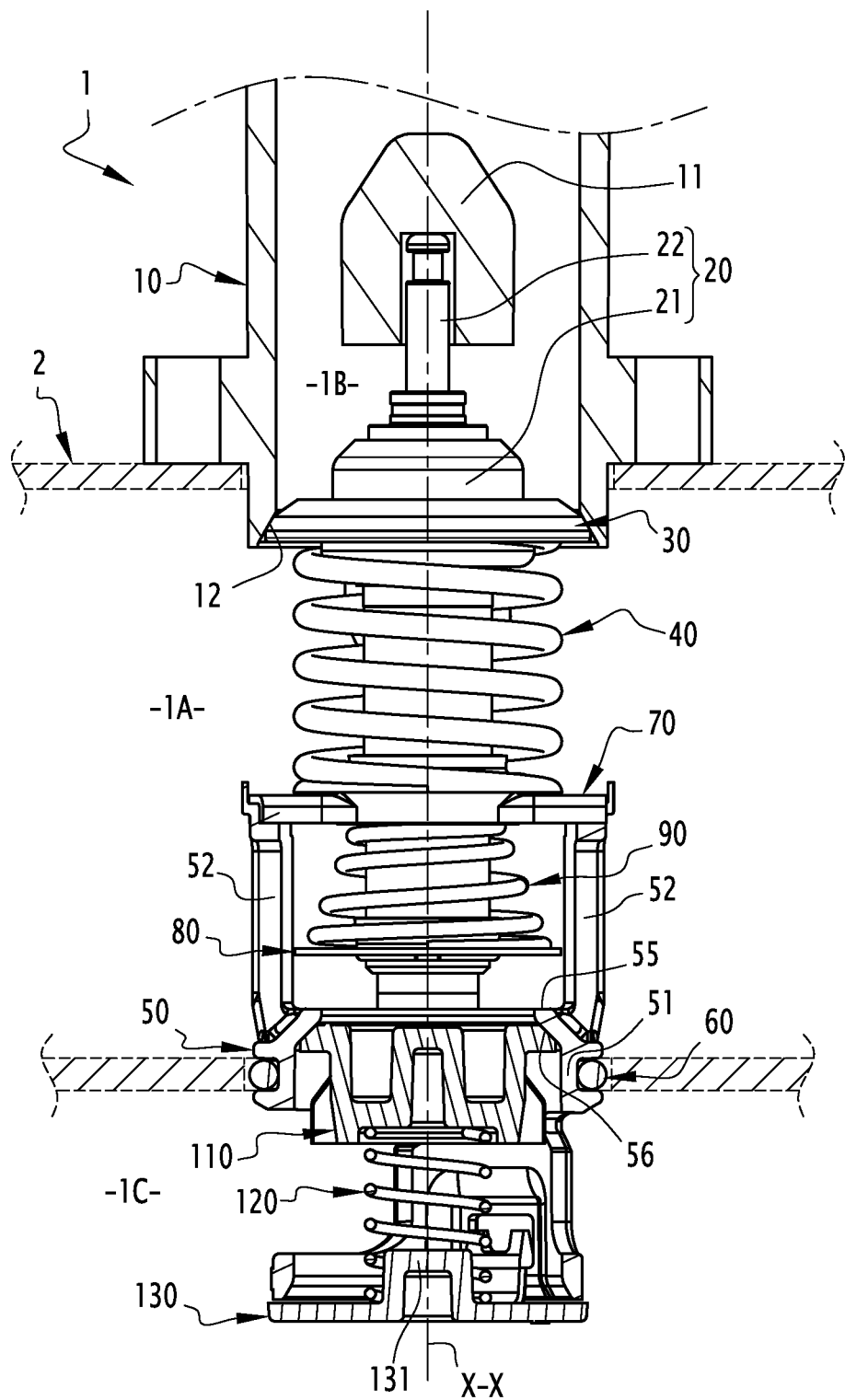
FIG. 5 is a cross-section along line V-V of FIG. 3.
Figure 6:
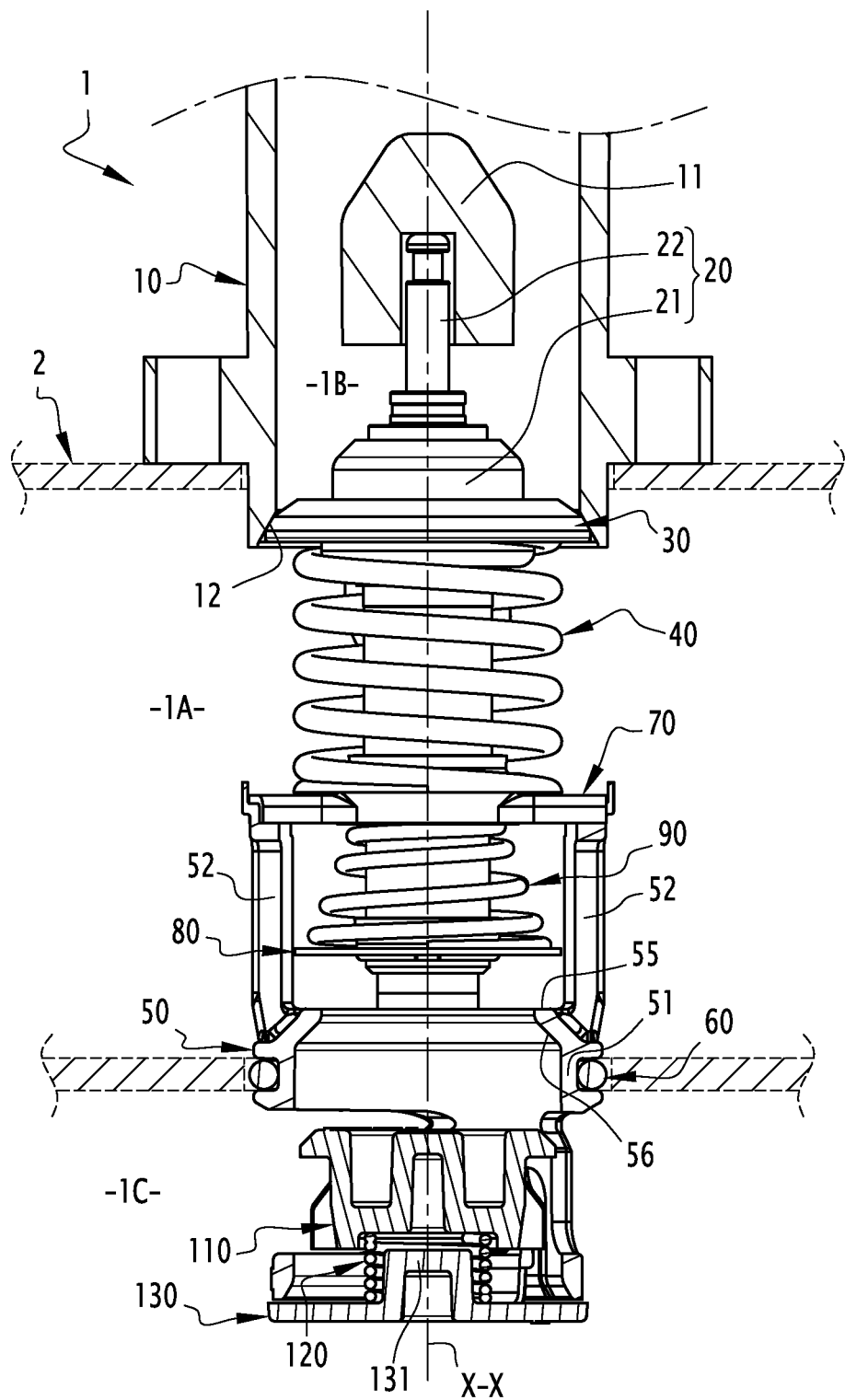
FIG. 6 is a view similar to FIG. 5, illustrating the valve in an operating configuration which is different from that illustrated in the previous figures.
Figure 7:
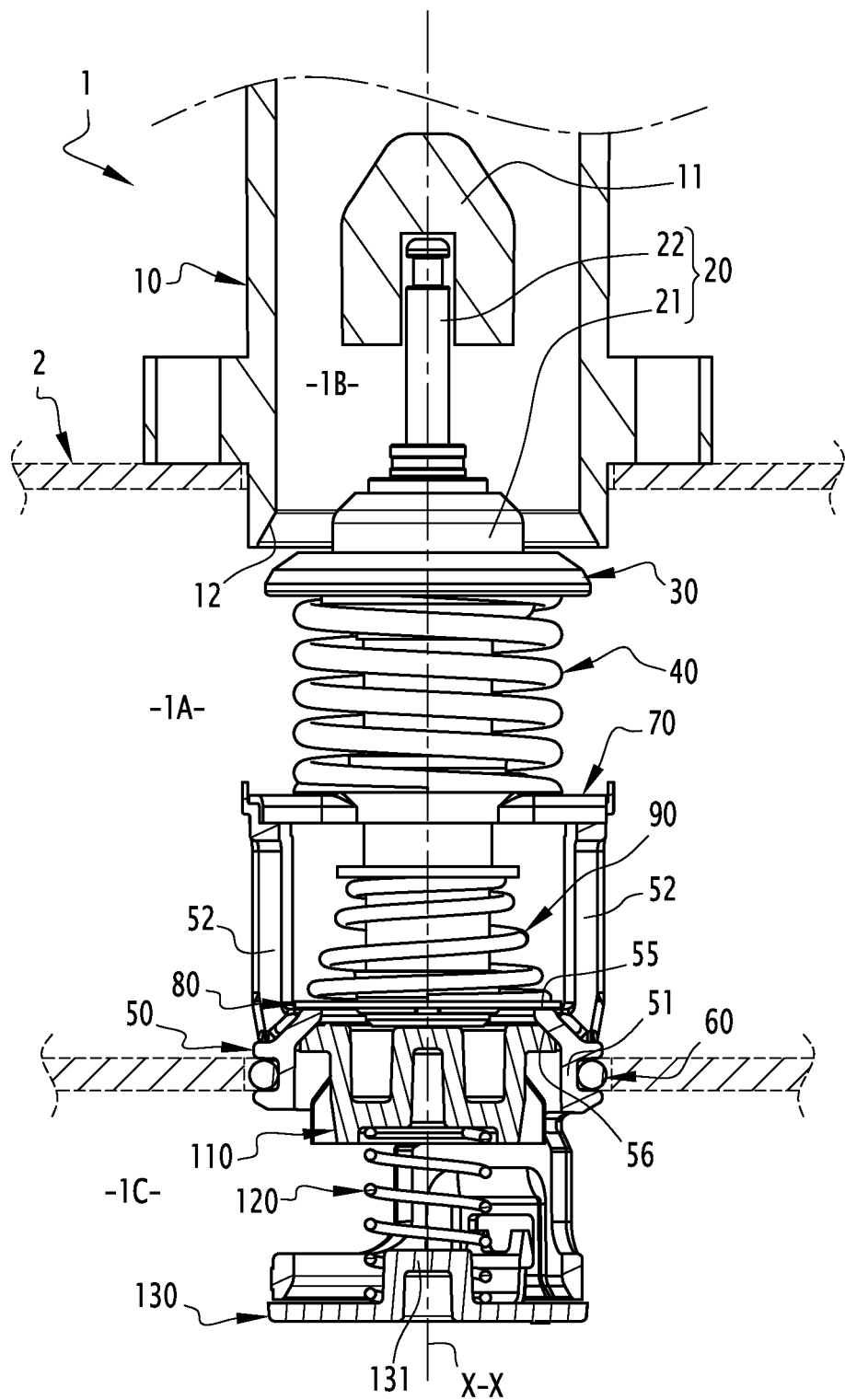
FIG. 7 is also a view similar to FIG. 5, but illustrating the valve in yet another operating configuration which is different from those illustrated in the previous figures.
Figure 8:
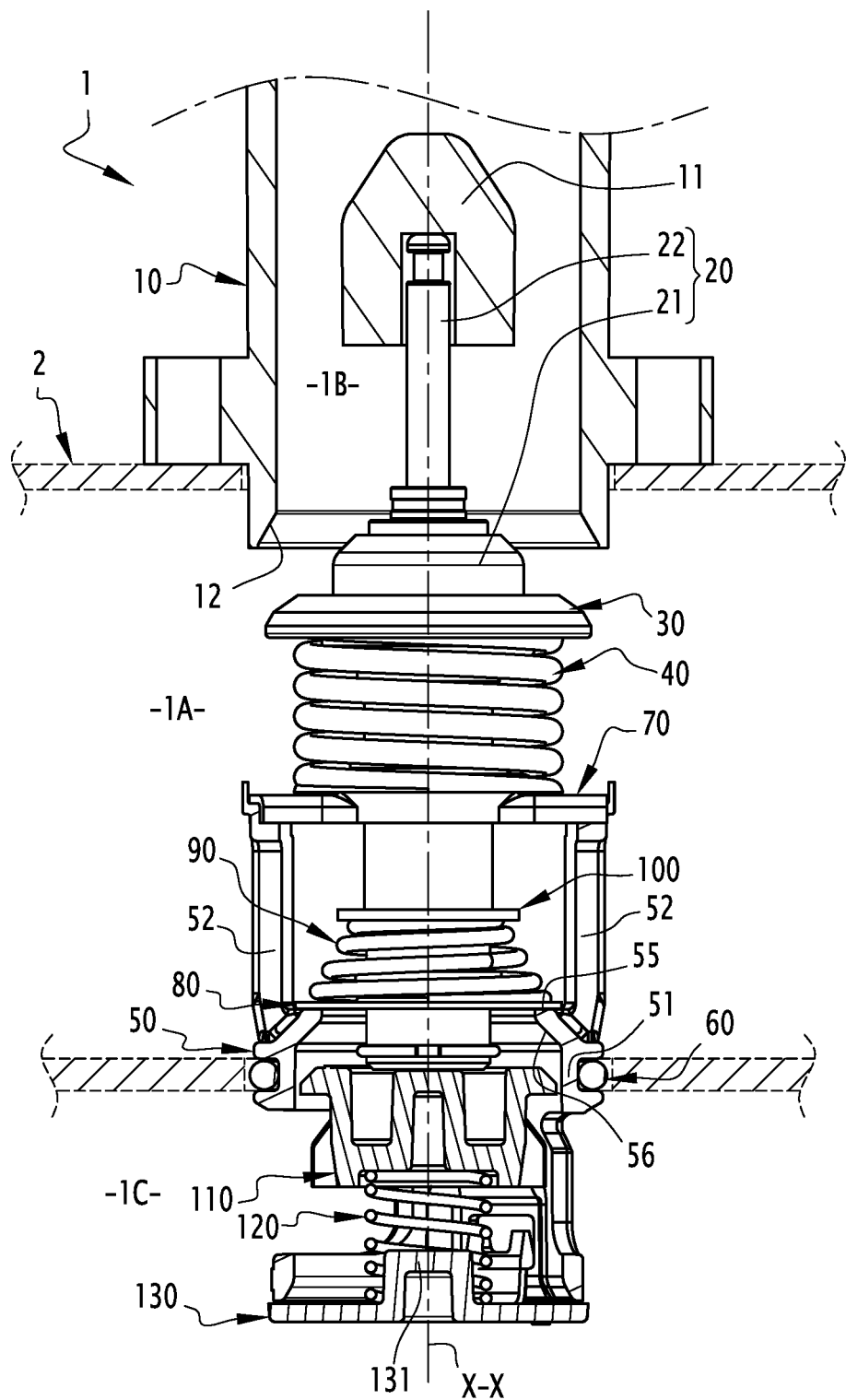
FIG. 8 is also a view similar to FIG. 5, illustrating yet another operating configuration, different from those illustrated in the previous figures.

Valve 1 also includes a shutter 30, hereinafter referred to as the main shutter. The main shutter 30 is movable along the X-X axis relative to a seat 12 of the housing 10 so as to open and close a corresponding fluid flow passage. The main shutter 30 can thus be moved between:

a closed position, which is illustrated in FIGS. 1 to 6 and in which the main shutter 30 is pressed, in particular along the X-X axis, against the seat 12, preventing, when the valve is in use, fluid from flowing between the paths 1A and 1B through this valve 1, and an open position, which is illustrated in FIGS. 7 and 8 and in which the main shutter 30 is away from the seat 12 allowing, when the valve 1 is in use, the fluid to flow between the paths 1A and 1B through this valve 1, which, in the application example defined above, means that at least some of the fluid entering via the path 1A passes through valve 1 into the path 1B outlet.

In order to control the movement of the main shutter 30, the shutter 30 is fixedly connected to the body 21 of the thermostatic element 20 in such a way that, when valve 1 is in use, the axial displacement of the body 21 with respect to the housing 10, resulting from the expansion of the thermally expandable material, causes a corresponding movement of the main shutter 20 so as to move it into the open position, by moving it axially away from the seat 12.

In the configuration shown in the figures, the main shutter 30 is similar to a valve, but this configuration is not restrictive. Similarly, the shape of the seat 12, which is necessarily adapted to that of the main shutter 30, is not limiting as long as this seat 12 is integrated into the housing 10, i.e. the seat 12 forms a whole with the housing, being permanently fixed to the housing, in particular by being integral with the latter. In particular, the specific features relating to the fixed connection between the main shutter 30 and the body 21 of the thermostatic element 20, as well as those relating to the co-operation between the seat 12 of the housing 10 and the part of the main shutter 30 designed to be supported against this seat 12 when the main shutter 30 is in the closed position, are not limiting, as many different designs are conceivable.

The valve 1 also comprises a return spring 40 which, when the valve 1 is in use, is designed to return the body 21 of the thermostatic element 20 towards the piston 22 of this thermostatic element when the thermodilatable material contracts, so as to drive the main shutter 30 into the closed position by moving the main shutter axially towards the seat 12 of the housing 10. To do this, the return spring 40 is functionally interposed between the body 21 and the piston 22 of the thermostatic element 20 so as to be compressed in the X-X axis when the body 21 and the piston 22 move axially away from each other. The physical configuration of the return spring 40 within the valve 1, in particular in the assembled state of the valve, will be detailed a little further on, in connection with other components of the valve 1 described below.

The valve 1 also includes a cage 50, which is in the form of a one-piece part and which, when the valve 1 is assembled, is fixedly attached to the housing 10. The cage 50 is thus designed to be fixedly assembled to the housing 10 when the valve 1 is assembled, as detailed below. In FIGS. 1 to 8, the cage 50 is shown assembled to the housing 10, while in FIGS. 9 and 10 it is shown being assembled to the housing. In a practical and economical configuration, the cage 50 is made of a plastic material.

In the configuration considered in the figures, the cage 50 includes a tubular part 51 that, in the assembled state of the valve 1, is substantially centred on the X-X axis. This tubular part 51, which extends through 360° around the X-X axis, has an outer face, i.e. a face facing away from the X-X axis, which is fixedly provided with a seal 60. When the valve 1 is in use, the seal 60 is arranged between the paths 1A and 1C so as to isolate them from each other outside the tubular part 51, as clearly seen in FIGS. 2 and 5 to 8. The specific features of the seal 60 and its fixed arrangement on the outside of the tubular part 51 are not limiting, as many different designs are possible. Seal 60 is an O-ring, for example.

Also in the configuration envisaged in the figures, the cage 50 includes force transmission elements 52 that each extend from the tubular part 51. In the example envisaged here, there are two of these force transmission elements 52 and they are diametrically opposed to each other with respect to the X-X axis, as clearly visible in FIGS. 1, 2 and 5. In all cases, when the cage 50 is assembled to the housing 10, these force transmission elements 50 are designed to axially support a bracket 70 of the valve 1, which is mounted so as to be axially movable on the body 21 of the thermostatic element 20 and on which the return spring 40 is supported. Thus, as can be clearly seen in FIGS. 1 to 5, in the assembled state of the valve 1, the return spring 40 is physically interposed, by being compressed in the X-X axis, between the bracket 70 and the main shutter 30. As an alternative, not shown, it should be noted that the return spring 40 may be supported not directly on the main shutter 30, but on the body 21 of the thermostatic element 20. In other words, in the configuration considered here, when the cage 50 is assembled to the housing 10, the return spring 40 is supported, by one of its axial ends, directly or indirectly against the main shutter 30 while, by its opposite axial end, the return spring 40 is supported directly or indirectly against the bracket 70, the corresponding bearing force being absorbed by the cage 50 via the force transmission elements 52 of the cage. More generally, in the assembled state of the valve 1, the opposing forces applied by the return spring 40 compressed in the X-X axis are applied respectively to the main shutter 30 and to the cage 50.

The specific features relating to the force transmission elements 52 and the bracket 70 are not limiting, as many different designs are possible. Advantageously, the respective parts of these force transmission elements 52 and of the bracket 70, at which the force transmission elements 52 are in contact with the brackets 70, are advantageously designed, in particular shaped, so as, in addition to ensuring the transmission of the forces originating from the return spring 40, to fix their relative position about the X-X axis and/or transversely to this X-X axis. Thus, as can be clearly seen in FIG. 4, bracket 70 has angled flanges between which the force transmission elements 52 are received, fixedly linking these force transmission elements and the bracket in rotation about the X-X axis. Furthermore, as can be clearly seen in FIG. 5, the force transmission elements 52 each have a projecting rim so that the bracket 70 is received between the respective projecting rims of the force transmission elements 52, fixedly connecting these force transmission elements and the bracket in a geometric plane perpendicular to the X-X axis.

Figure 3:
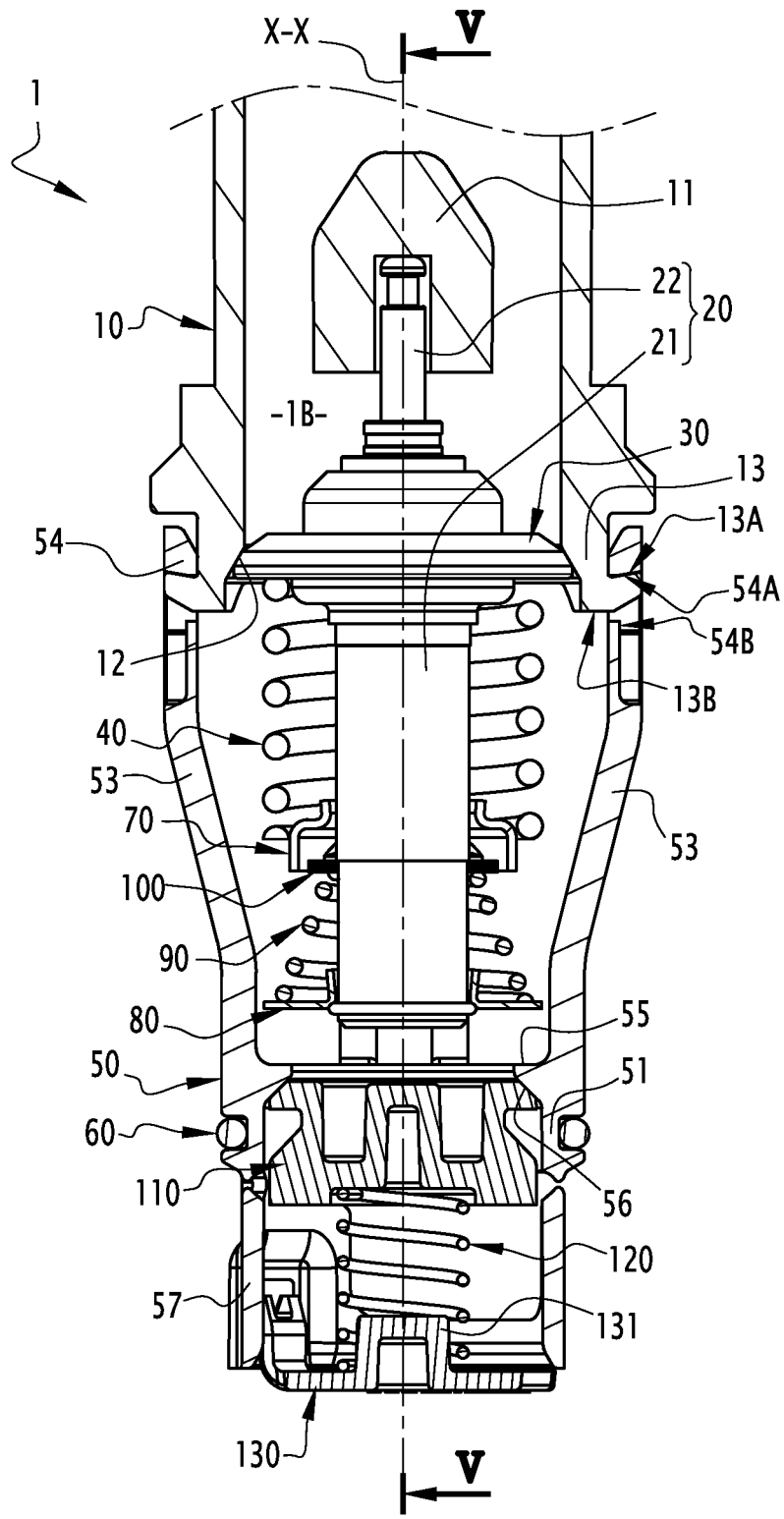
FIG. 3 is a partial cross-section along line Ill-Ill of FIG. 2.
Figure 4:
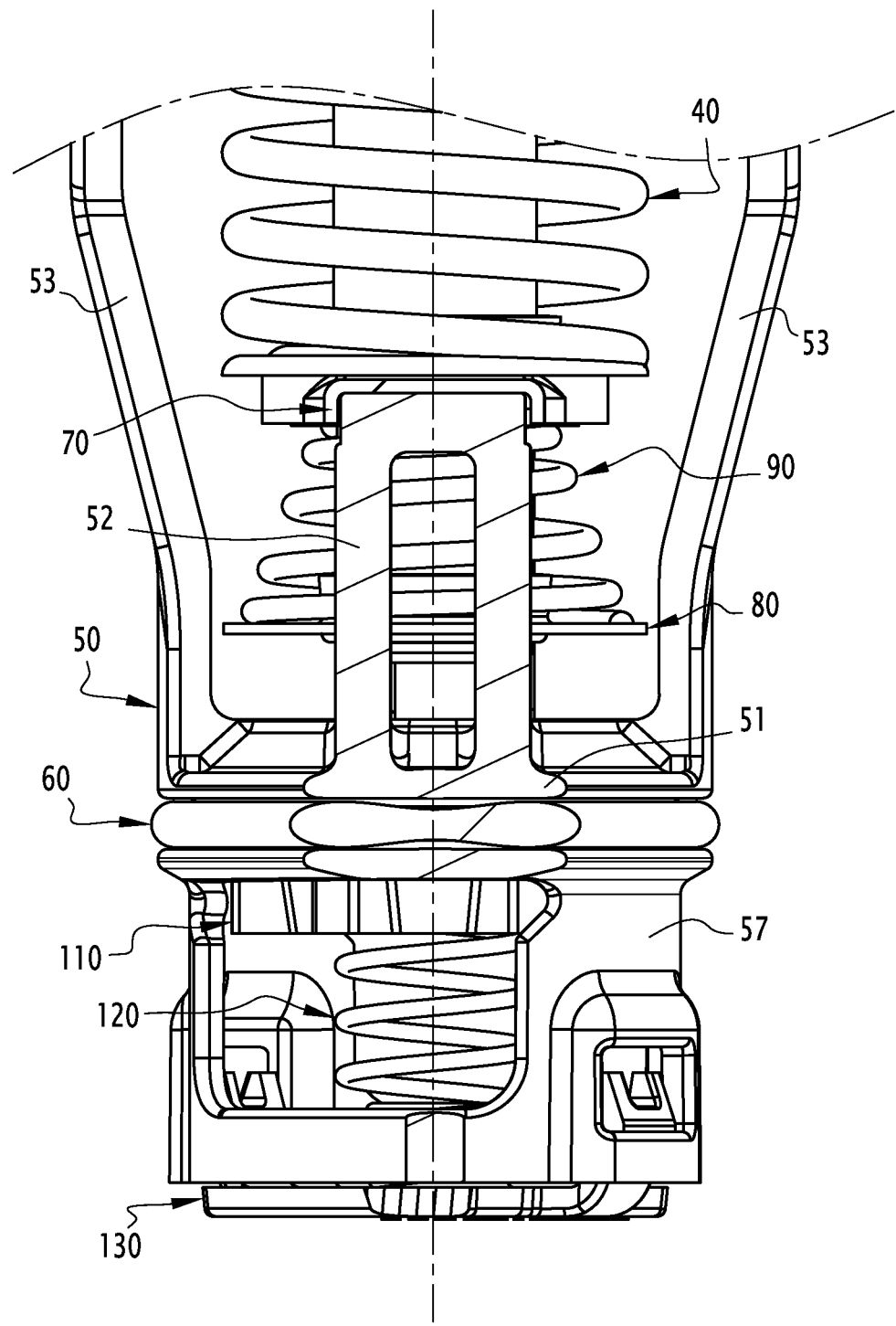
FIG. 4 is a partial cross-section along line IV-IV of FIG. 2.

For the purposes of its assembly to the casing 10, the cage 50 includes, in the configuration considered in the figures, arms 53 which each extend towards the casing 10 from the tubular part 51 of the cage 50. In the example shown here, there are two of these arms 53, diametrically opposite each other in relation to the X-X axis, as can be seen in FIGS. 1 and 3. Each of the arms 53 has, opposite the tubular part 51 of the cage 50, an end 54 which is designed, when the cage 50 is in a state assembled to the casing 10, to retain the corresponding arm 53 relative to the housing 10 by cooperating in a form-fitting manner with a lug 13 of the housing 10. It is understood that the housing 10 has as many lugs 13 as the cage 50 has arms 53. In the configuration under consideration, each lug 13 is arranged, in the assembled state of the cage 50, between the X-X axis and the end 54 of the corresponding arm 53 in a direction transverse to the X-X axis. This is equivalent to saying that, in the assembled state of the cage 50, the lugs 13 are arranged, radially to the X-X axis, between the respective ends 54 of the arms 53, as clearly visible in FIG. 3.

According to a particularly advantageous form of construction, which is shown in the figures, the end 54 of each arm 53 is provided with a hooking surface 54A which, when the cage 50 is assembled to the housing 10, is pressed axially against a complementary hooking surface 13A provided on the lug 13 of the housing associated with the relevant end 54. As can be seen in FIG. 3, the hooking surfaces 54A and 13A are shaped like "fir tree teeth", i.e. they are inclined with respect to the X-X axis so as to lock their support in the assembled state of the cage 50. In the example shown here, the hooking surfaces 54A and 13A are inclined towards the tubular part 51 of the cage 50 in the direction of the X-X axis. In this way, in the assembled state of the cage 50, the forces applied to the cage 50 by the return spring 40 tend to keep the end 54 of each arm 53 and the lug 13 associated with this arm hooked with each other, in the sense that the inclination of the corresponding hooking surfaces 54A and 13A tends to prevent their relative unhooking. The attachment surfaces 54A and 13A thus secure the fixed assembly of the cage 50 to the housing 10.

Furthermore, according to an advantageous optional configuration, the end 54 of each arm 53 is also provided with an axial stop 54B which, when the cage 50 is in the assembled state to the housing 10, is in the immediate vicinity, along the X-X axis, of an axial stop 13B provided on the lug 13 associated with the end 54 in question. As is clearly visible in FIG. 3, these axial stops 54B and 13B are designed to interfere axially with each other so as to prevent unhooking of the hooking surfaces 54A and 13A in the assembled state of the cage 50. In particular, any handling of the valve 1 in the assembled state, which would tend to bring the tubular part 51 axially closer to the casing 10, causes axial support between the axial stops 54B and the axial stops 13B, which prevents unhooking of the hooking surfaces 54A and 13A. The axial stops 54B and 13B thus increase the security of the assembly of the cage 50 to the housing 10.

Figure 9:
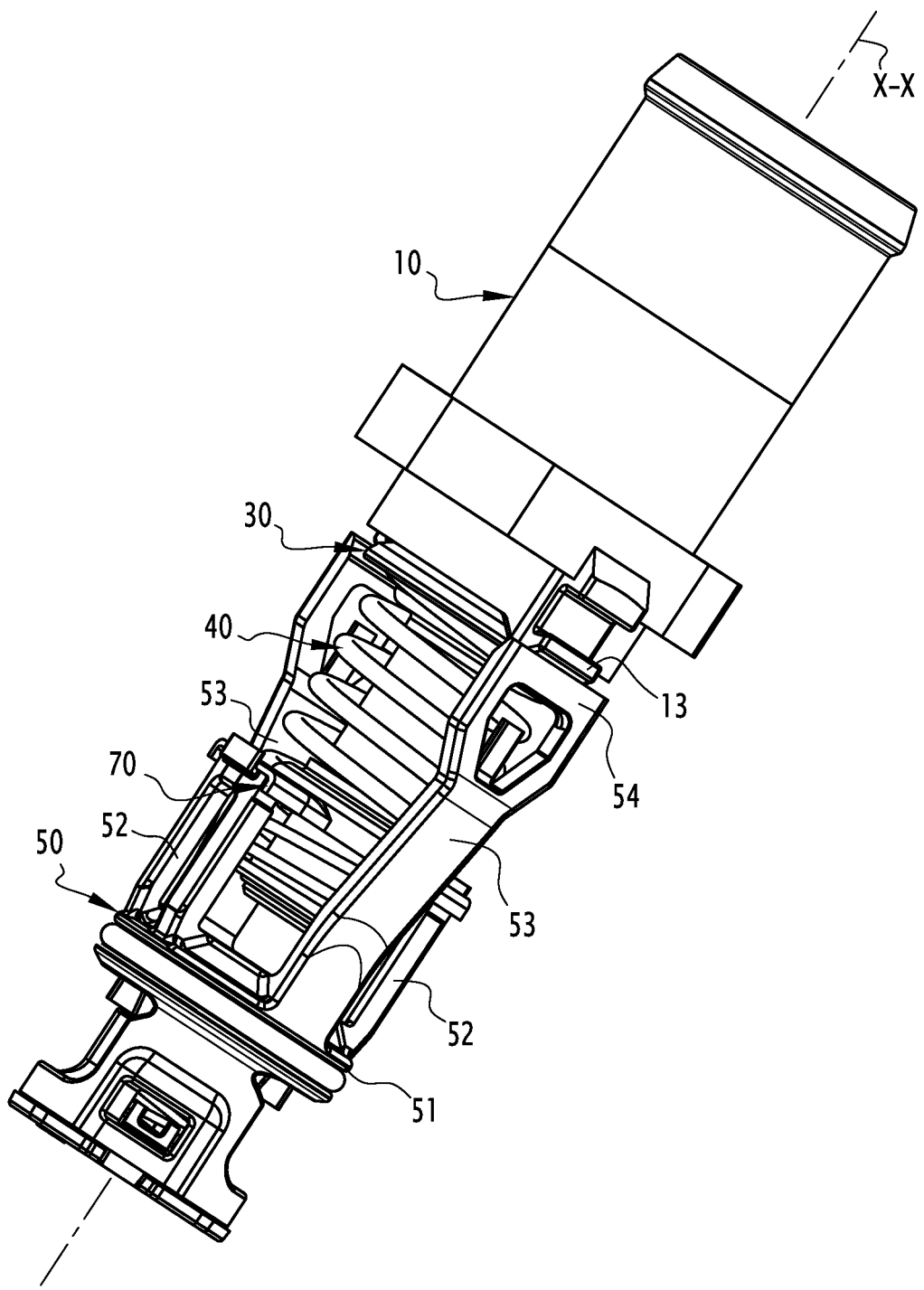
FIG. 9 is a view similar to FIG. 1, but showing the valve being assembled.
Figure 10:
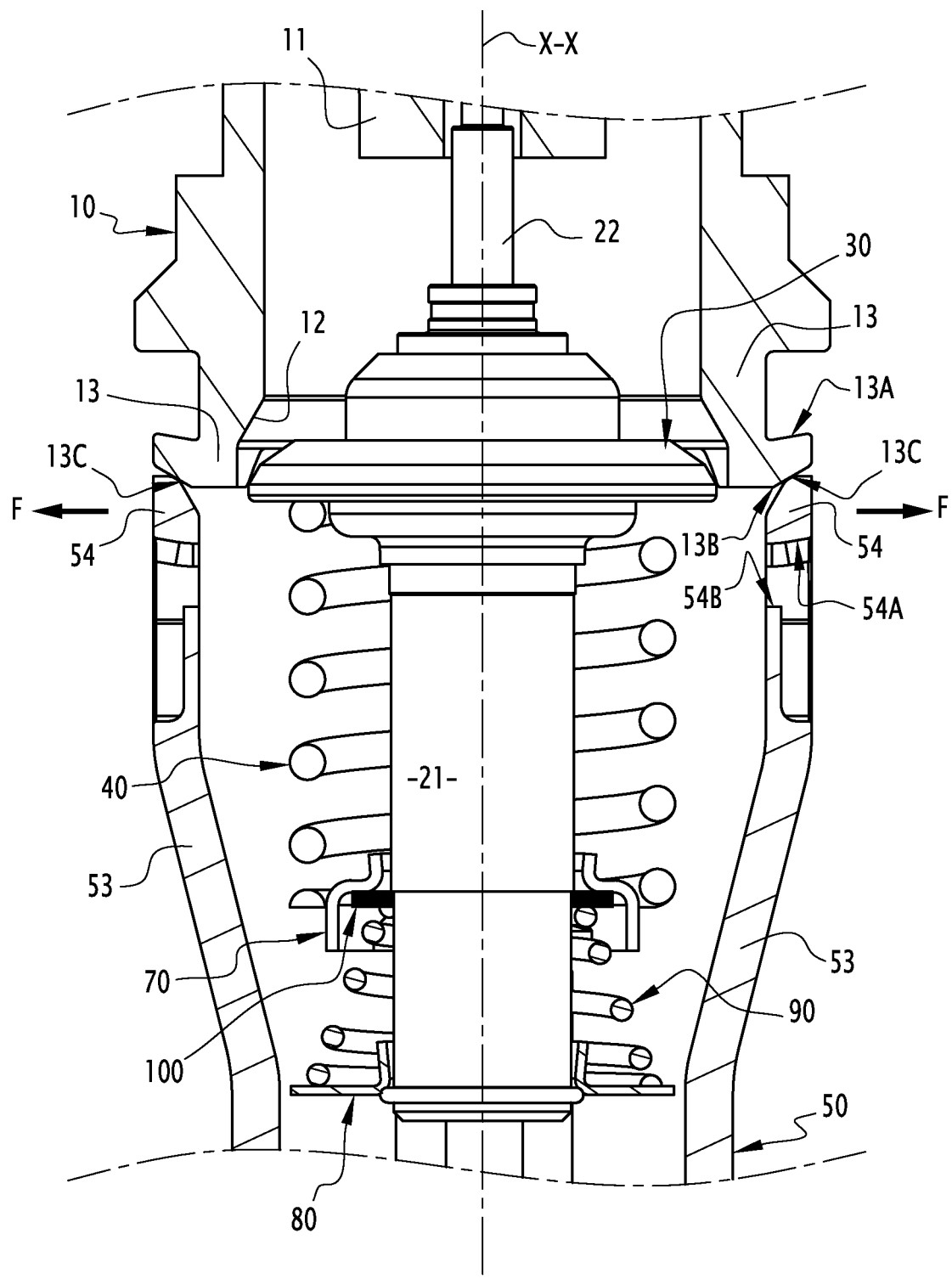
FIG. 10 is a similar view to FIG. 3, illustrating the valve in its assembled state as shown in FIG. 9.

As a further optional but particularly advantageous aspect, relating to the arms 53 of the cage 50, these arms 53 have a certain elastic deformation capacity which is used when assembling the cage 50 to the casing 10. In other words, the arms 53 are designed to be elastically deformable so that the ends 54 of the arms 53 can be brought into contact with the lugs 13 of the casing 10. More precisely, during assembly of the cage 50 to the housing 10, in particular after the arms 53 have been positioned close to the lugs 13 as illustrated in FIGS. 9 and 10, the arms 53 are elastically deformed so as to move their ends 54 away from the X-X axis until the lugs 13 can be fitted between the ends 54. This spacing between the ends 54 of the arms 53 is indicated by arrows F in FIG. 10. By elastic return of the arms 53, the ends 54 are then returned towards the X-X axis, clamping the lugs 13 between them, which results in the assembled state of the cage 50, illustrated in FIGS. 1 to 8. According to a practical configuration, the separation of the ends 54 of the arms 53 results from an axial approach of the tubular part 51 with respect to the casing 10, by means of the sliding of the ends 54 against ramp surfaces 13C, with which the lugs 13 are respectively provided and which are inclined towards the tubular part 51 in the direction of the X-X axis. Alternatively or additionally, dedicated tooling can be used to spread the ends 54 by deforming the arms 53. In any case, when the cage 50 is assembled, the release of the elastic deformation of the arms 53 causes the ends 54 to pinch the lugs 13, thus reinforcing the stability of the assembly of the cage 50 to the casing 10.

Whatever the design of the cage 50, the valve 1 also includes a shutter 80, which is separate from the main shutter 30 and which will hereinafter be referred to as a by-pass shutter. The bypass shutter 80 is movable along the X-X axis relative to a seat 55 of the cage 50 so as to open and close a corresponding fluid flow passage. The by-pass shutter 80 can thus be moved between:
  a closed position, which is illustrated in FIGS. 7 and 8 and in which the by-pass shutter 80 is pressed, in particular along the X-X axis, against the seat 55, preventing fluid from flowing through the valve 1 between the paths 1A and 1C when the valve is in use, and
  an open position, which is illustrated in FIGS. 1 to 6 and in which the by-pass shutter 80 is away from the seat 55, allowing, when the valve 1 is in use, the fluid to flow between the paths 1A and 1C through this valve 1, which, in the application example defined above, means that at least some of the fluid entering via the path 1A can be passed through valve 1 to the path 1C outlet.

To control the movement of the by-pass shutter 80, the latter is linked for movement to the body 21 of the thermostatic element 20 so that, when the valve 1 is in use, the body 21 drives the by-pass shutter 80 into the open position when the main shutter 30 is driven into the closed position and so that the body 21 drives the by-pass shutter 80 into the closed position when the main shutter is driven to the open position. In this way, the body 21 of the thermostatic element 20 controls the movement of the main shutter 30 and the by-pass shutter 80 in opposite directions, closing one when the other opens, and vice versa.

In the configuration shown in the figures, the by-pass shutter 80 is similar to a valve, but this configuration is not restrictive. Similarly, the shape of the seat 55, which is necessarily adapted to that of the by-pass shutter 80, is not restrictive as long as this seat 55 is integrated into the cage 50, i.e. the seat 55 forms a whole with the cage 50, being permanently fixed to the cage 50, in particular by being integral with the cage. In the example shown in the figures, the seat 55 is advantageously integrated into the tubular part 51 of the cage 50. In particular, the seat 55 can be formed by the axial end of the tubular part 51 facing the housing 10.

With regard to the connection in terms of movement between the by-pass shutter 80 and the body 21 of the thermostatic element 20, one possibility consists of a fixed connection, at least along the X-X axis. This being so, according to an advantageous aspect which is implemented in the configuration considered in the figures, the by-pass shutter 80 is mounted so as to be axially movable on the body 21 of the thermostatic element, while nevertheless being connected in displacement to this body 21 between its open and closed positions by an overtravel spring 90 which is compressed in the X-X axis by applying opposing forces respectively to the bypass operator 80 and to the body 21 of the thermostatic element 20. As long as the by-pass shutter 80 is between its open and closed positions, the overtravel spring 90 holds the by-pass shutter 80 at a fixed height, along the X-X axis, of the body 21, at which the by-pass shutter 80 is for example held axially against a circlip or a shoulder of the body 21. When the expansion of the thermodilatable material of the thermostatic element 20 causes the body 21 to move away from the piston 22 while the by-pass shutter 80 is in the closed position, the overtravel spring 90 collapses elastically, as illustrated in FIG. 8, thus allowing the body 21 to move axially with respect to the by-pass shutter 80 which remains in the closed position, i.e. which remains pressed against the seat 55 which is fixed with respect to the housing 10. The overtravel spring 90 thus prevents damage to the valve 1 when the thermostatic element 20 is in overtravel, i.e. deploys over a significant travel, in particular greater than that just necessary for the bypass shutter 80 to press against the seat 55.

In the example shown in the figures, the overtravel spring 90 is physically interposed, along the X-X axis, between the by-pass shutter 80 and a retaining member 100, such as a washer, which is fixedly connected, at least along the X-X axis, to the body 21 of the thermostatic element 20. In an advantageous configuration, this retaining member 100 also serves to axially retain the bracket 70 relative to the body 21 when the cage 50 is not assembled to the housing 10. As can be seen in FIG. 10, as long as the bracket 70 is not supported by the force transmission elements 52 when the cage 50 is not assembled to the housing 10, the return spring 40 causes the bracket 70 to support the retaining member 100. The features of the valve 1 relating to the retaining member 100 facilitate the process of assembling the valve 1, in particular by enabling the body 21 of the thermostatic element, the main shutter 30, the return spring 40, the bracket 70, the by-pass shutter 80 and the overtravel spring 90 to be pre-assembled together, independently of the housing 10 and the cage 50.

Valve 1 also includes a shutter 110, which is separate from the main shutter 30 and the by-pass shutter 80, and which will hereinafter be referred to as a pressostatic shutter. The pressostatic shutter 110 is movable along the X-X axis relative to a seat 56 of the cage 50 so as to open and close a corresponding fluid flow passage. Seat 56 is separate from seat 55 associated with the by-pass shutter 80. The pressostatic shutter 110 can thus be moved between:

a closed position, which is illustrated in FIGS. 1 to 5 and 7 and in which the pressostatic shutter is pressed, in particular along the axis X-X, against the seat 56 preventing, when the valve 1 is in service, the fluid from flowing between the paths 1A and 1C through this valve 1, and an open position, which is illustrated in FIGS. 6 and 8 and in which the pressostatic shutter 110 is away from the seat 56, allowing, when the valve 1 is in use, the fluid to flow between the paths 1A and 1C through this valve 1, which, in the example application defined above, means that at least some of the fluid entering via the path 1A can pass through the valve 1 into the outlet of the path 1C.

It is understood that, when the valve 1 is in use, the fluid only flows effectively between the paths 1A and 1C through the valve 1 when both the by-pass shutter 80 is in the open position and the pressostatic shutter 110 is in the open position, as in the operating configuration illustrated in FIG. 6. When either one of the bypass shutters 80 and the pressostatic shutter 110 is in the closed position, it prevents fluid from flowing between the paths 1A and 1C through valve 1, even if the other of these shutters 80 and 110 is in the open position, as shown in FIGS. 1 to 5 and FIG. 8.

In the configuration shown in the figures, the flow of fluid between the paths 1A and 1C when the by-pass shutters 80 and pressostatic shutters 110 are both in the open position is provided through the inside of the tubular part 51 of the cage 50.

To control the movement of the pressostatic shutter 110, the latter is mounted on the cage 50 so as to be driven into the open position by the fluid when there is excess pressure in the path 1A relative to the path 1C. When there is pressure equilibrium between the paths 1A and 1C, in other words when the paths 1A and 1C are pressure-balanced, the pressostatic shutter 110 is driven into the closed position by a return spring 120 which is compressed in the X-X axis by applying opposing forces respectively to the pressostatic shutter 110 and to the cage 50.

In the configuration shown in the figures, the pressostatic shutter 110 is housed inside a skirt 57 of the cage 50, which extends away from the casing 10 from the tubular part 51 of this cage. In the assembled state of the valve 1, the pressostatic shutter 110 is received inside the skirt 57 and is guided therein in movement between its open and closed positions, in particular by complementarity of shape between the inner face of the skirt 57 and complementary projections provided on the outer lateral face of the pressostatic shutter 110 and between which the fluid is free to flow in the direction of the axis X-X. In order to retain the pressostatic shutter 110 inside the skirt 57, the thermostatic valve 1 comprises a retainer 130, such as a clip, which is fixedly attached to the skirt 57 by any suitable form of connection. The return spring 120 advantageously rests on this retainer 130, being centred on the X-X axis by a relief 131 on the retainer 130, as clearly visible in FIGS. 3 and 5.

With regard to the seat 56, its shape, which is necessarily adapted to that of the pressostatic shutter 110, is not limiting as long as this seat 56 is integrated into the cage 50, i.e. the seat 56 forms a whole with the cage 50, being fixedly connected to the cage 50, in particular by being made of the same material as the cage. In the example shown in the figures, the seat 56 is delimited by the inner face of the tubular part 51.

According to an advantageous optional configuration, which in particular makes it possible to increase the axial compactness of the valve 1, the pressostatic shutter 110 is arranged with respect to the cage 50, in particular inside the skirt 57 of the cage, so as to be driven by the body 21 of the thermostatic element 20, from its open position to its closed position when the expansion of the thermodilatable material of the thermostatic element 20 causes the body 21 to move away from the piston 22 when the by-pass shutter is in the closed position. In other words, when the body 21 is over-travelled, i.e. moved beyond its course just necessary for the by-pass shutter 80 to be supported against the seat 55, the body 21 interferes axially with the pressostatic shutter 110, moving it from its closed position to its open position, as shown in FIG. 8.

Taking into account the explanations given so far, it is understood that to assemble the valve 1, an interesting possibility consists of initially preparing a first sub-assembly comprising the body 21 of the thermostatic element 20, the main shutter 30, the return spring 40, the bracket 70, the by-pass shutter 80, the overtravel spring 90 and the retaining member 100. Advantageously, this first sub-assembly is handled as a single unit, as explained above in conjunction with the retaining member 100. This first sub-assembly may include the piston 22, which is then attached to the housing 10, or this first sub-assembly may be attached to the piston 22 after the latter has been secured to the housing 10. In both cases, the assembly obtained is then assembled to a second pre-assembled sub-assembly which includes the cage 50, the seal 60, the pressostatic shutter 110, the return spring 120 and the retainer 130, as illustrated in FIGS. 9 and 10 and as explained previously in connection with these FIGS. 9 and 10. This method of assembling the valve 1 is particularly practical, since the second sub-assembly is attached in one piece to the other components of the valve 1, which are pre-assembled with each other. Once assembled in this way, the valve 1 can be handled, in particular transported, until it is mounted on the casing 2, without running the risk of one of the components of the valve 1 becoming unexpectedly detached from the other components.

The operation of valve 1 will now be described with reference to FIGS. 5 to 8, in the context of the application example defined above.

In the operating configuration shown in FIG. 5, the fluid entering via the path 1A is both prevented by the main shutter 30 in the closed position from flowing through the valve 1 into the path 1B and prevented by the pressostatic shutter 110 in the closed position from flowing through the valve 1 into the path 1C, even though the by-pass shutter 80 is in the open position. This operating configuration occurs when the fluid entering via the path 1A has both a low temperature and a balanced pressure compared to that in the path 1C. This is typically the case when starting the engine mentioned above, which is intended to be cooled by the fluid. Thus, when the aforementioned engine is started and in the moments that follow, it is important that the fluid in the path 1A does not flow either towards the exchanger via the path 1B, or bypass this exchanger via the path 1C.

If the pressure of the fluid in the path 1A increases and this the path 1A is at excess pressure relative to the path 1C, the fluid in the path 1A acts mechanically on the pressostatic shutter 110 and drives the latter from its closed position to its open position, as shown in FIG. 6. The fluid entering via the path 1A continues to be prevented by the main shutter 30 in the closed position from flowing through valve 1 into the path 1B, but the fluid from the path 1A is then sent in its entirety through valve 1 into the path 1C because the by-pass shutters 80 and pressostatic shutters 110 are in the open position. This operating configuration occurs, for example, shortly after the aforementioned engine is started, the excess pressure being of the order of a few tenths of a bar and resulting from a slight heating of the fluid in the path 1A compared with the path 1C.

If the temperature of the fluid in the path 1A rises, the thermodilatable material of the thermostatic element 20 expands. The body 21 of the thermostatic element 20 then moves away from the piston 22 and drives both the main shutter 30 from its closed position to its open position and the by-pass shutter 80 from its open position to its closed position. The fluid admitted to the path 1A is then divided between the paths 1B and 1C.

If the temperature of the fluid in the path 1A continues to rise, the by-pass shutter 80 reaches its closed position. The fluid admitted to the path 1A is then sent in its entirety through valve 1 to the path 1B.

If the temperature of the fluid in the path 1A continues to rise and the expandable material of the thermostatic element 20 expands to such an extent that the body 21 is displaced over a distance greater than that just required for the by-pass shutter to rest against the seat 55, the body 21 is overtravelled, as shown in FIG. 8. If necessary, the body 21 moves the pressostatic shutter 110 from its closed position to its open position, the by-pass shutter 80 remaining in the closed position due to the elastic compression of the over-travel spring 90.

If the temperature of the fluid in the path 1A then decreases, the thermodilatable material of the thermostatic element 20 contracts and, under the decompression effect of the return spring 40, the body 21 is returned towards the piston 22. After the overtravel of the body 21 has been cleared, the bypass shutter 80 is driven from its closed position to its open position, while, conversely, the main shutter 30 is driven from its open position to its closed position.

There are also a number of options and variants to the valve 1 described above. For example:
- the design of the thermostatic element 20 is not limiting; in particular, this thermostatic element may, as an option, be controlled, i.e. incorporate an electric heating resistor; moreover, the thermostatic element 20 may have various diameters, the relative proportions between its body 21 and its piston 22 not being limited to that shown in the figures;
- rather than fixedly connecting the piston 22 of the thermostatic element 20 to the housing 10, it may be the body 21 of this thermostatic element which is provided fixedly with respect to the housing 10, the piston 22 then constituting the movable part of the thermostatic element, performing the drive function described for the body 21 in relation to the configuration shown in FIGS. 1 to 10;
- rather than being fixedly connected to the movable part of the thermostatic element 20, the main shutter 30 may be mounted on this movable part with freedom of movement along the X-X axis, subject to being associated with a dedicated return spring; the main shutter 20 can then incorporate a relief function in the event of a pressure difference on either side of the main shutter;
- as mentioned above, the valve-type design of the by-pass shutter 80 shown in the figures is not restrictive; thus, as an alternative not shown, the by-pass shutter may be provided in the form of a sleeve which is centred on the X-X axis and which slides axially along the associated seat 55, the latter having a cylindrical geometry which is centred on the X-X axis and the inner contour of which is adjusted to the outer contour of the sleeve; the sliding radial support of the sleeve relative to this seat controls the opening/closing of a corresponding flow passage, which may be lateral to the X-X axis rather than being in the X-X axis as in the configuration illustrated in the figures; and/or
- as a not shown alternative, the valve 1 may be without the bracket 70, with the return spring 40 bearing directly on the cage 50, in particular on the force transmission elements 52 of the latter.

The valve (1) comprises a housing (10), a thermostatic element, a first shutter displaced by the thermostatic element along an axis (X-X) relative to a first seat integrated into the housing to control a flow of fluid between the first and second paths, a cage (50) which is in one piece and fixedly assembled to the housing, a first return spring (40) compressed in the axis by applying opposing forces to the first shutter and the cage, a second shutter (80) axially displaced by the thermostatic element relative to a second shutter (80) axially displaced by the thermostatic element with respect to a second seat integrated into the cage to control a flow of fluid between the second path (1A) and a third path (1C), a third shutter (110) axially displaced by the fluid overpressure in the second path relative to a third seat integral with the cage to control fluid flow between the second and third paths, and a second return spring (120) compressed axially by applying opposing forces to the third shutter and the cage. The cage includes a tubular part (51), which is centred on the axis and through the interior of which fluid flows between the second and third paths when the second and third shutters are open. An outer face of the tubular part of the cage is provided with a seal (60) which, in use, isolates the second and third channels outside the tubular part from each other. The cage also includes arms (53), each of which extends towards the housing from the tubular part and connects the cage to the housing.

The invention claimed is:

1. A thermostatic valve, comprising:
a housing adapted, in use, to channel a fluid along a first path and to be fixedly attached to a casing provided to channel the fluid along a second and third path,
a thermostatic element including a fixed part, which is fixedly connected to the housing, and a movable part, that is movable along an axis with respect to the fixed part, moving away from the fixed part under action of an expansion of a thermodilatable material of the thermostatic element,
a first shutter that is axially movable relative to a first seat integrated with the housing between a first closed position, in which the first shutter is pressed against the first seat, preventing the fluid from flowing between the first and second paths through the thermostatic valve, and a first open position, in which the first shutter is away from the first seat, allowing the fluid to flow between the first and second paths through the thermostatic valve, the first shutter being connected to the movable part of the thermostatic element so that, when the thermodilatable material expands, the movable part drives the first shutter into the first open position, a one-piece cage adapted to be fixedly assembled to the housing, a first return spring, which is compressed in the axis by applying opposing forces respectively to the first shutter and to the cage, and which, when the thermodilatable material contracts, returns the movable part towards the fixed part of the thermostatic element, driving the first shutter into the first closed position, a second shutter that is axially movable relative to a second seat integrated with the cage between a second closed position, in which the second shutter is pressed against the second seat, preventing the fluid from flowing between the second and third paths through the thermostatic valve, and a second open position, in which the second shutter is away from the second seat, allowing the fluid to flow between the second and third paths through the thermostatic valve, the second shutter being connected to the movable part of the thermostatic element so as to be driven into the second open position when the first shutter is driven into the first closed position and to be driven into the second closed position when the first shutter is driven into the first open position, a third shutter that is axially movable relative to a third seat integrated with the cage between a third closed position, in which the third shutter is pressed against the third seat, preventing the fluid from flowing between the second and third paths through the thermostatic valve, and a third open position, in which the third shutter is away from the third seat, allowing the fluid to flow between the second and third paths through the thermostatic valve, the third shutter being mounted on the cage so as to be driven by the fluid into the third open position when the second path is pressurised relative to the third path, and a second return spring, which is compressed in the axis by applying opposing forces respectively to the third shutter and to the cage, and which, when the second and third paths are pressure-balanced, drives the third shutter into the third closed position, wherein the cage includes a tubular part, which is substantially centred on the axis and through inside which the fluid flows between the second and third paths when the second and third shutters are in the second and third open positions respectively, wherein an outer face of the tubular part of the cage is provided with a seal that, in use, isolates the second and third paths from each other outside the tubular part, and wherein the cage further includes arms, which each extend towards the housing from the tubular part and which connect the cage to the housing.

2. Thermostatic valve according to claim 1, wherein the cage is made of a plastic material.

3. The thermostatic valve according to claim 1, wherein the arms each comprise, opposite the tubular part, an end which, when the cage is in an assembled state in which the cage is connected to the housing, retains the arm relative to the housing by cooperating in a form-fitting manner with a lug of the housing.

4. The thermostatic valve according to claim 3, wherein said end of each arm and the lug of the housing, which is associated with said end, are respectively provided with hooking surfaces, which, in the assembled state of the cage, are pressed against each other and which are inclined with respect to the axis so as to lock their support in the assembled state of the cage.

5. The thermostatic valve according to claim 4, wherein said end of each arm and the lug of the housing, which is associated with said end, are respectively provided with axial stops which are designed to interfere axially with each other so as to prevent unhooking of the hooked surfaces in the assembled state of the cage.

6. The thermostatic valve according to claim 3, wherein the arms are elastically deformable so that, when the cage is assembled to the housing, the said ends of the arms are first moved away from the axis by deformation of the arms in order to arrange the lugs of the housing between the said ends, then are returned towards the axis by elastic return of the arms to clamp the lugs of the housing between said ends in the assembled state of the cage.

7. The thermostatic valve according to claim 1, wherein the cage also includes a skirt for receiving the third shutter, which extends away from the housing from the tubular part and inside which the third shutter is housed and is guided between the third closed and open positions, and wherein the thermostatic valve also comprises a retainer, which is fixedly attached to the skirt and on which the second return spring is supported, being centred on the axis by a relief of the retainer.

8. The thermostatic valve according to claim 1, wherein the cage also includes force transmission elements, which each extend from the tubular part and which are designed, when the cage is assembled to the housing to axially support a bracket which is mounted so as to be axially movable on the movable part of the thermostatic element and on which the first return spring is supported.

9. The thermostatic valve according to claim 1, wherein the thermostatic valve also comprises an overtravel spring, which is compressed in the axis by applying opposing forces respectively to the second shutter and to the movable part of the thermostatic element, this overtravel spring being designed to:

movably link the movable part of the thermostatic element with the second shutter when the second operator is driven between the second open and closed positions, and be elastically compressed when the expansion of the thermodilatable material causes the movable part to move away from the fixed part of the thermostatic element when the second shutter is in the second closed position.

10. The thermostatic valve according to claim 9, wherein the cage also includes force transmission elements, which each extend from the tubular part and which are designed, when the cage is assembled to the housing, to axially support a bracket which is mounted so as to be axially movable on the movable part of the thermostatic element and on which the first return spring is supported, and wherein the movable part of the thermostatic element is fixedly connected to a retaining member, against which the overtravel spring is supported, and against which the first return spring causes the bracket to bear in order to retain the bracket axially with respect to the movable part as long as the bracket is not supported by the force transmission elements when the cage is not assembled to the housing.

* * * * *